US008869046B2

(12) United States Patent
Brown et al.

(10) Patent No.: US 8,869,046 B2
(45) Date of Patent: Oct. 21, 2014

(54) SYSTEM AND METHOD FOR ONLINE RATING OF ELECTRONIC CONTENT (75) Inventors: Wendell Brown, Henderson, NV (US); Craig Taro Gold DeRousse, Henderson, NV (US); Daniel E. Vaughan, Fremont, CA (US)

(73) Assignee: Wendell Brown, Henderson, NV (US)

( * ) Notice: Subject to any disclaimer, the term of this patent is extended or adjusted under 35 U.S.C. 154(b) by 75 days.

(21) Appl. No.: 13/541,544

(22) Filed: Jul. 3, 2012

(65) Prior Publication Data
US 2014/0013241 A1 Jan. 9, 2014

(51) Int. Cl.
*G06F 3/00* (2006.01)

(52) U.S. Cl.
USPC ............ 715/753; 715/751; 715/230; 715/232; 705/26.7

(58) Field of Classification Search
USPC ......... 715/753, 230, 751, 233, 232, 716, 255, 715/266; 707/E17.111; 705/26.7
See application file for complete search history.

(56) References Cited

U.S. PATENT DOCUMENTS

| 7,228,305 | B1* | 6/2007 | Eyal et al. .............................. 1/1 |
| 7,739,584 | B2* | 6/2010 | Vella et al. ..................... 715/203 |
| 7,809,773 | B2* | 10/2010 | Horowitz et al. ............. 707/805 |
| 8,140,973 | B2* | 3/2012 | Sandquist et al. ............ 715/719 |
| 8,543,929 | B1* | 9/2013 | Holloway ..................... 715/757 |
| 2004/0237032 | A1* | 11/2004 | Miele et al. .................... 715/512 |
| 2009/0087160 | A1* | 4/2009 | Lui et al. .......................... 386/66 |
| 2009/0204882 | A1* | 8/2009 | Hollander et al. ............. 715/230 |
| 2009/0210779 | A1* | 8/2009 | Badoiu et al. ................. 715/230 |
| 2011/0119160 | A1* | 5/2011 | Houvener et al. ............. 705/27.1 |
| 2011/0231887 | A1* | 9/2011 | West et al. ..................... 725/116 |
| 2012/0150997 | A1* | 6/2012 | McClements, IV .......... 709/217 |
| 2013/0045673 | A1* | 2/2013 | Tan ............................. 455/3.05 |

OTHER PUBLICATIONS

Lerman, Kristina, Dynamics of Collaborative Document Rating Systems, Aug. 2007, ACM; 10 pages.*
Shi et al.; "Reliable Object Rating Framework for Content Sharing System", Sep. 2011, IEEE; 6 pages.*

* cited by examiner

*Primary Examiner* — Doon Chow
*Assistant Examiner* — Wendy Nicholas
(74) *Attorney, Agent, or Firm* — Park, Vaughan, Fleming & Dowler LLP (57) ABSTRACT

A system and method are provided for rating online electronic content. A compilation of information or other item of electronic content is presented to a user, along with comments. The comments may target discrete portions of the content item (e.g., a sentence, a statement, an assertion), the content as a whole, or another comment. A user is able to identify a specific portion of the content item as a target for a new comment, which will automatically be associated with that portion. Users may rate the content item, a portion of the item and/or other users' comments based on credibility and/or other traits (e.g., bias, accuracy, violence, enjoyability, prurience). Users' ratings are tallied to produce an overall rating for comments, commentators, portions of content item, entire content items, a program or series or other source of the content item, etc.

17 Claims, 8 Drawing Sheets

SYSTEM AND METHOD FOR ONLINE RATING OF ELECTRONIC CONTENT

BACKGROUND

This invention relates to the field of computer systems, and more particularly to a system and methods for dynamically rating the credibility and/or other characteristics of online electronic content.

Many people receive news, commentary, entertainment and other content online instead of, or in addition to, traditional sources such as television, newspaper and radio. Online content includes content in textual, video and multimedia formats, and providers of online content span the spectrum from large, professional "old media" institutions (e.g., CBS Nightly News) to solo individuals (e.g., bloggers, tweeters) who may provide information and content as more of a hobby than a profession.

However, discerning consumers of online information face the same concern regardless of the type of source—that of ascertaining the credibility of a given provider. Although a well-established institutional information provider may have processes and personnel in place to check facts and authenticate sources, there is no guarantee that its reporting will be more neutral and accurate than an independent blogger reporting on the same event or topic.

Many online information sources strive to eliminate bias and uphold a high level of veracity, with varying degrees of success; others make less of an effort. Thus, when a consumer reads a textual report or watches a video or multimedia report, he or she may strongly disagree with some or all of the report because of a belief or certainty that it lacks credibility, that an alleged "fact" is false or misleading, etc.

For example, an online information consumer may have personal knowledge that an asserted fact is false, may know that the reporter has reason to be biased, or may be aware of some evidence that contradicts an allegation or assertion. However, other consumers that are unaware of the same evidence may accept the report as truthful or unbiased, and have no reason to question its credibility.

Similarly, a consumer may strongly agree with an allegation or assertion, and may know of even better evidence that supports it. If the allegation or assertion is controversial, other consumers that do not know of the additional supporting evidence may doubt its credibility.

Yet other consumers may value characteristics other than credibility. For example, they may tend to evaluate or seek electronic content based on its entertainment value, its clarity, its prurience, its inclusion of sporting activities, etc.

Unfortunately, as yet there is no effective method of commenting on online content in a targeted manner (e.g., to address its credibility, accuracy, entertainment value or other characteristic) that focuses on specific portions of the content, and that makes those comments available in context (e.g., when those portions are read or viewed). Instead, comments are generally associated with a report or content item as a whole, and arguments against different portions are muddled together, thereby severing any clear links between the comments and their targets.

For example, online content venues may provide comment boards for commenting on an entire content item (e.g., a documentary, a news story on a given topic, a music video). Such tools do not make contributors' comments available to other readers/viewers in context with the portions of the content targeted by the comments, but rather are generally only seen after the content item and are thus inherently linked with the item as a whole. In addition, contributions to an online comment board tend to degenerate into a stream of unsubstantiated opinions, personal attacks and banter unrelated to the substance of the content item.

Because of the lack of explicit connection to any specific portion of a given content item, any comments, blogs, letters to the editor or other responses that directly target a specific allegation, assertion or piece of the content are generally lost among all the other comments. Thus, even if a comment is made that persuasively rebuts (or bolsters) the substance of some portion of the item, it cannot be easily uncovered, and certainly not in temporal or spatial proximity to the corresponding portion of the content item.

Further, existing venues that accept comments regarding online content do not provide means for allowing the content, or comments on the content, to be ranked or rated by readers/viewers. For example, some readers/viewers may find a news report very persuasive, or a particular comment on that report to be particularly credible, or to have an effect on their opinion of the content, and may wish to voice their admiration. Conversely, someone who strenuously rejects a proposition or assertion may desire to rate it accordingly, perhaps to make it known that the report is not entirely credible.

A user who would like to make a targeted comment on a different aspect of a content item is similarly disadvantaged. For example, he or she may desire to make an amusing comment on a specific portion of the item, or elaborate on some occurrence within the content.

Because comprehensive schemes for accumulating rankings or ratings of electronic content and/or comments on electronic content do not exist, readers/viewers are deprived of a tool that could be of great use in finding or recognizing desirable content, content providers/sources and/or commentators.

SUMMARY

In some embodiments of the invention, a system and methods are provided for rating online electronic content. In these embodiments, a content item (e.g., a news report, a professional commentary, a documentary, a news or opinion blog, a video clip, a movie, a sporting event) is presented to a user, along with associated comments. A comment may target a discrete portion of the content item, the item as a whole, or even another comment.

A user is able to identify a specific portion of the content item (e.g., a phrase, a sentence, a statement, an assertion, a scene) as a target for a new comment, and the new comment will automatically be associated with that portion. As presentation of the content item advances (e.g., in a media player), the comments also advance, so that for each time index of the content item, comments associated with portions of the item that encompass the time index are available for viewing.

Users may rate an entire content item, a portion of the item and/or other users' comments based on credibility and/or other categories (e.g., bias, accuracy, violence, enjoyability, clarity, prurience). Users' ratings are tallied to produce an overall rating for one or more portions of the content item, the entire item, a program or series or other source of the content item, etc. Users may also (or instead) rate individual comments.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In some embodiments of the invention, a system and method are provided for facilitating the rating of an online electronic content item, a collection of electronic content and/or a provider or source of electronic content.

In particular, the credibility, accuracy, bias, enjoyability or other aspect of a content item may be rated, such as a documentary, a blog, a tweet, an article, a report, a story, an editorial and so on. In addition, ratings associated with multiple content items may be used to develop a rating of a show or series that comprises the items, or a broadcast network or other source of the items.

An item of content may comprise text, video and/or audio. In addition, comments, opinions and/or other responses to content items may be rated, and may be used to assemble a rating of a particular commentator.

A content provider rated according to an embodiment of the invention may be the original source of the content (e.g., a company that releases a report on a product or some research, a news company reporting a news story, a movie studio, a producer of a television show), or may simply be republishing or relaying information from an original source (e.g., an online news aggregator that publishes news produced by original sources). A rating of such of a content provider may be attributed to either or both the original source and/or the re-publisher.

The term "content provider" also may be used herein to refer to commentators who make comments or provide opinions on electronic content, because their comments and opinions can also be considered "content."

In some embodiments of the invention, a website or other online venue that presents electronic content to consumers simultaneously provides the consumer with means for making instant comments and/or ratings regarding that content. The comments will be associated with the portion or portions of the content to which the comments apply (e.g., a portion that was presented when a comment was made).

A "portion" of a content item that serves as a target of a comment may correspond to a particular allegation, assertion, alleged fact, opinion, and so on, and may comprise a word, a phrase, a sentence, multiple sentences, a line, a song, etc.

For example, when a consumer has reason to doubt the veracity of an assertion within a content item (e.g., because she knows of evidence to the contrary) or, conversely, supports and wishes to bolster the assertion, she can choose to make a comment that will be automatically associated with the portion of the item in which the assertion was made. Or, she may specifically mark, tag or identify the target portion of the content item.

Her comment may comprise text, audio and/or video, and she may upload or link evidence that supports her comment if desired, such as a hyperlink to another content item that disagrees with or disproves the assertion, a document providing research supporting the assertion, etc.

She may rate the credibility of the information within some scale (e.g., one to ten), with a number of stars, with a binary "credible" or "not credible" evaluation, etc. Various schemes for rating content are discussed further below. In the absence of explicit numerical or other objective rating input, a user's comment or viewpoint may serve as the basis for rating the content item. Specifically, positive comments may be interpreted as a favorable rating, while negative comments may be interpreted as an unfavorable rating.

Consumers that peruse the report afterward will see (and/or hear, possibly) the comments, or possibly a tag, marker other alert, in context with the assertion. The content of a comment may be presented directly, or may be represented by an icon or control the user can manipulate to access the comment. The consumers may rate the original content and/or the earlier consumer's comment, and may also be able to provide evidence and/or a rating in addition to or instead of simply entering supporting comments or counter-arguments.

Figure 1:
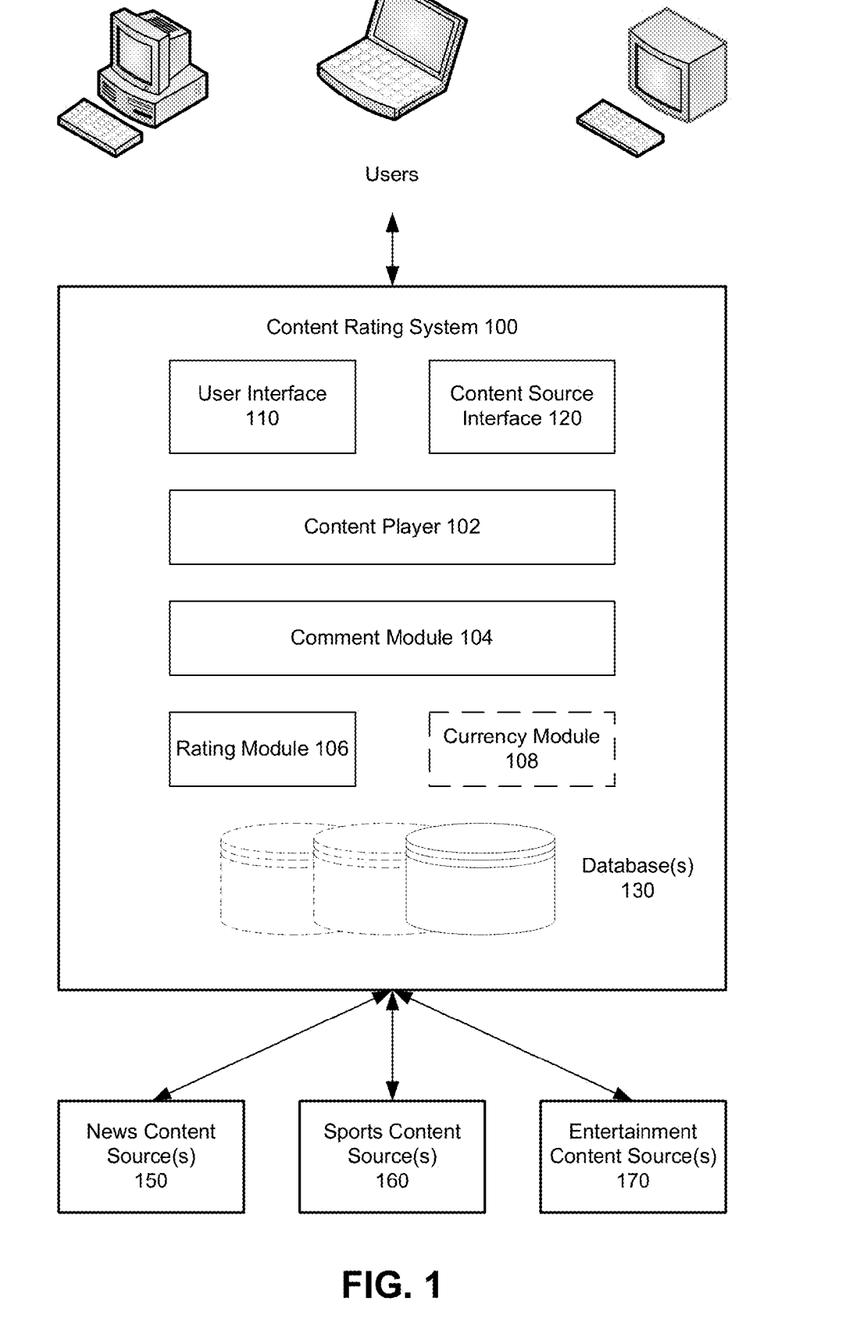
FIG. 1 is a block diagram of a computing environment in which some embodiments of the present invention may be implemented.

FIG. 1 is a block diagram of a computing environment in which an embodiment of the invention may be implemented.

Content rating system 100 is configured to allow users of virtually any type of computing device to access online content, comment upon it and/or rate it. System 100 includes user interface 110 for interfacing with users, and content source interface 120 for interfacing with content sources, such as news content sources 150, sports content sources 160 and entertainment content sources 170. In some embodiments, interfaces 110 and 120 may be combined.

Although the content sources are distinguished by type in FIG. 1, such differentiation is unnecessary in other embodiments of the invention in which some or all content sources/providers may be considered comparable. However, in the illustrated embodiments of the invention, different types of content items may be rated differently.

For example, news content may be rated according to its credibility or veracity, sports content may be rated according to the athletic prowess exhibited by subjects of the content, and entertainment content may be rated according to how much it is enjoyed. In other implementations, ratings of these and/or other types of content may have other significance (e.g., bias, clarity, amusement, attractiveness, quirkiness, level of disgust, violence, sexual content, appropriateness for certain age groups).

The term "content item" should be understood to encompass sporting events, recaps of individual sports plays, movies, music videos, songs, pictures, and so on—virtually any type of data that can be comprehended by a human.

Content rating system 100 also comprises content player 102, comment module 104, rating module 106, optional currency module 108 and database(s) 130. Databases 130 may be configured to store any or all of the data manipulated by the system, including but not limited to: content, user profiles, content provider profiles, comments, ratings, histories of rating, and so on.

Content player 102 is configured to present online content to users. The player may therefore present text, audio and/or video, of any format(s) now known or hereafter developed. Content that is presented via player 102 may be stored locally in system 100 and/or streamed from a remote site (e.g., the source or original provider of the content). In some alternative embodiments of the invention, content player 102 may reside and execute on a user's computing device, and may be provided by an operator of system 100 or some other source.

Comment module 104 enables a user to enter a comment and tie it to any portion or portions of a compilation content item. A target portion may be marked or demarcated by the user, or may have been defined by another user, the system or an operator of the system.

The user is also able to upload or link with her comment supporting data of virtually any type. A comment may thus include commentary by the user in any form (text, video, audio, multimedia), or may solely include supporting data (i.e., uploaded and/or linked data) the commentator believes is relevant to the target of his comment, or may include both commentary and supporting data.

The user's comments and/or supporting data may be scanned by the system to block or resist malware (e.g., viruses, worms, adware) and/or other undesired content (e.g., spam, pornography, swearing, personal attacks). Undesired content may be stricken or edited by the system (or an operator) to remove the offending section, or a comment including such content may be rejected.

Offensive comments, or offensive content within a comment, may be identified by other users (e.g., via their ratings), which may cause such comments or content to be excised or modified.

Comment module 104 is also operable to allow a user to comment on a comment submitted by another user. In some embodiments, functionality of the comment module may differ depending on the "level" of comment being submitted—in other words, whether it is a $1^{st}$ level comment directly referencing a content item, a $2^{nd}$ level comment that targets a $1^{st}$ level comment, a $3^{rd}$ level comment responding to a $2^{nd}$ level comment, etc.

For example, the system may reflect a preference for $1^{st}$ level comments by allowing comments at that level to include virtually any supporting data. A subsequent level may be more restricted, for example, by allowing links to online materials but not allowing uploads of commentator-provided data.

User comments may be stored separately from content (e.g., on different servers, by different organizations), and thus served separately for presentation to a user, or they may be stored together. Advantageously, in some embodiments of the invention, user comments pertaining to specific sections or portions of a content item are presented to the user, or offered for presentation, close in time (e.g., simultaneously) with those sections or portions of the information compilation.

Rating module 106 enables users to rate or vote on content items presented via information player 102, and/or other users' comments, and may operate with or in cooperation with comment module 104. Thus, a comment may be submitted without rating the associated content item, a rating may be submitted without a comment, and so on.

As used herein, a "rating" of a content item or comment may be positive or negative, expressing support or derision for content of target of the rating. However, a monolithic "vote" for a content item or comment may inherently signify support for or appreciation for its viewpoint or substance.

A rating may be binary, such as "credible" or "not credible", "impressive" or "not impressive," "enjoyable" or "not enjoyable," "biased" or "not biased" and so on, or may be more complex. For example, numerical or other ordinal rankings may be made within one or more specific categories, such as credibility, impressiveness, enjoyability, bias, accuracy, violence, sexual content, clarity, etc.

Illustratively, a low ordinal value in a category may signify that the rater believes the target of the rating has little association with that category, and a high value signifies that close association is observed. Thus, a rating of 1 (out of 10) in a credibility category for a particular portion of a content item signifies that the rater gives little credibility to whatever is asserted or alleged in that portion, while a rating of 9 signifies that a high level of credibility is allotted.

Rating module 106 may also be configured to tally multiple user ratings. Ratings may be tallied for an individual comment, a chain of comments, portions of a content item and/or an entire item, but may also be tallied by commentator (i.e., to tally ratings of his/her comments), content provider (e.g., by tallying ratings of multiple compilations from the same provider), a particular program or show that includes one or more rated content items, etc.

Ratings are thus generated by and reflect opinions of a user community that is limited only by the size of the Internet and/or other public accessible networks. Users within the community may have unique skills or resources that can be employed to accurately characterize the credibility (or other trait) of online content and content providers.

Further, demographics of a user community may be considered and used to characterize support or lack of support for particular content and/or comments. For example, ratings of users within certain defined groups (e.g., based on age, sex, ethnicity, religion, language, location) may be monitored to determine what they consider credible, or biased, or entertaining, or violent, etc. Thus, even if the overall rating of the credibility of a particular portion of a content item is substantially neutral, users within different demographic groups may rate them very differently.

In addition, based on a user's ratings within one or more particular categories (e.g., enjoyability, prurience, amusement), the system may be able to recommend to a user content that he or she may enjoy. Thus, in some embodiments of the invention, when a user enters a rating within those categories for a particular content item, the system may correlate that user's rating with other users', and identify one or more other content item that the user would likely rate highly within the categories.

Optional currency module 108, if implemented, may be tied to rating module 106. In particular, currency module 108 may enable the use of system "currency" with which to rate content. Illustratively, multiple types of currency may be implemented, wherein different types are obtained differently and may be used in different ways or with different effect.

For example, a "basic" type of currency may be awarded automatically to users, perhaps a set amount every month, week or other period of time. New users may receive an initial set of basic currency (e.g., after registering).

Basic currency may be used to rank individual content items, and a user may be able to "spend" just one unit or, alternatively, any number of basic currency units on rating a particular item. When a user exhausts his or her basic currency, he or she can make no more votes or ratings that employ basic currency until more of the currency is received.

An "earned" currency may be characterized by being earned by users. Such currency may illustratively be earned by making comments on content items, rating content items, parsing a content item into portions that may serve as targets of user comments, and/or other tasks. For example, when a comment submitted by a given user is ranked highly by another user, or is commented upon by another user, the given user may garner more "earned" currency.

A "hard" currency may be characterized by being purchased, and may be available to any user at any time. Different types of currency may or may not differ in strength or weight. For example, for rating purposes, one unit of "earned" currency may count more than one unit of basic currency.

In some embodiments, ratings may be segregated by categories associated with the different currency types. Thus, basic currency votes and ratings may be tallied separately from "earned" and "hard" currency.

Figure 2:
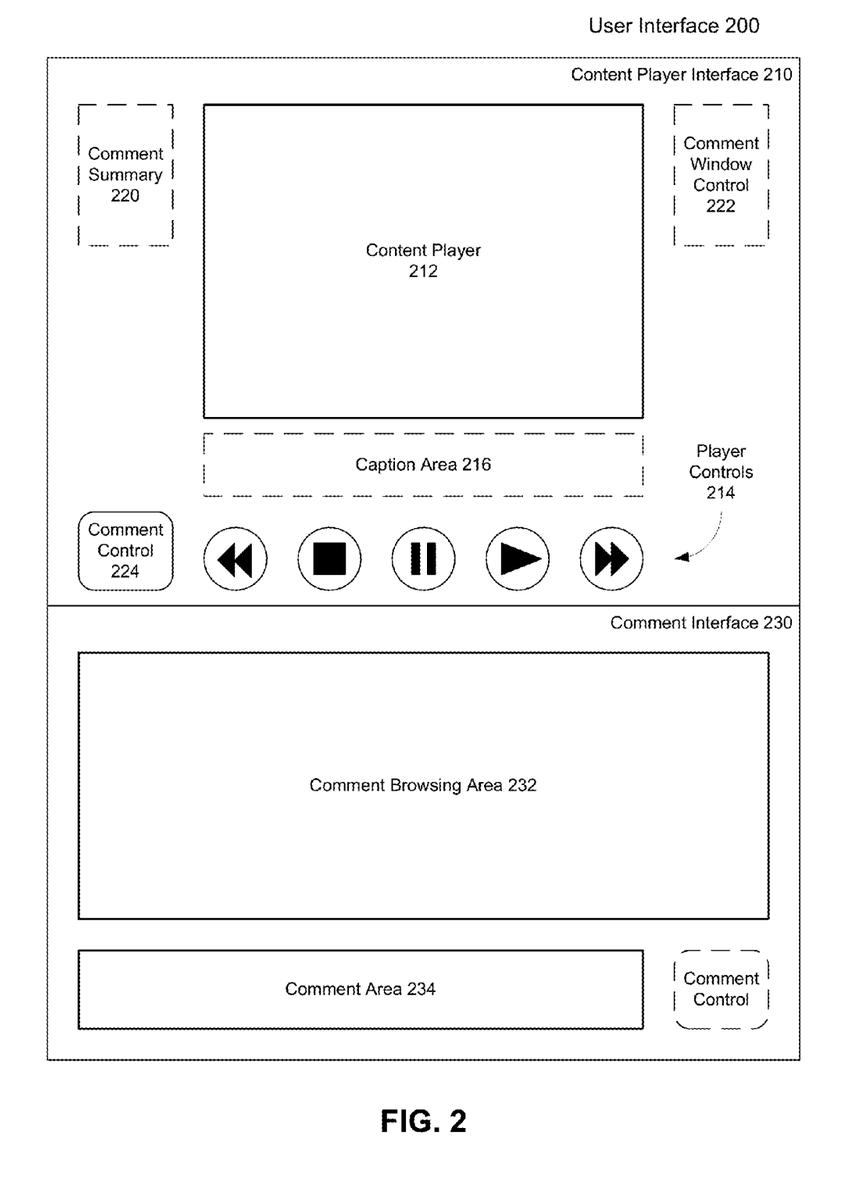
FIG. 2 is a diagram of a user interface for presenting online content and associated comments, in accordance with some embodiments of the present invention.

FIG. 2 is a block diagram of a user interface for an online rating system, according to some embodiments of the invention. In these embodiments, user interface 200 may be employed to present content, receive comments and obtain rankings. User interface 200 is illustrative only, and does not limit the scope of comparable user interfaces that may be employed in other embodiments of the invention.

In the illustrated embodiments of the invention, user interface 200 comprises two primary components—content player interface 210 and comment interface 230.

Content player interface 210 is configured to present content, particularly content items comprising audio and/or video. User interface 200, or player interface 210, may be displayed when a user selects a content item to be played. Thus, prior to display of interface 200 and/or 210, the system may present a different interface to help the user select a content item.

Content player 212 presents a content item, and may comprise a media player now known or hereafter developed. Player controls 214 allow a user to control the presentation of a content item (e.g., play, pause, stop, fast forward, rewind, increase/decrease volume). Optional caption area 216 may present textual transcripts (or close-caption text) of audio portions of an item.

Comment summary 220 may be implemented to provide a user with a quick summary of existing comments regarding the content item being played. For example, summary 220 may reveal how many comments have been posted for the entire item, how many have been associated with a portion of the item currently being played, an aggregated rating of the item (or current portion of the item), text of new comments as they are submitted, etc.

Comment window control(s) 222 may be implemented to help a user mark or define a portion of a content item. For example, when a user decides to make a comment, he may first use player controls 214 to locate the start of a statement, video clip, sentence or other portion of the content item, and then use control(s) 222 to mark it. He would then do the same with the end of the portion he wishes to define. Alternatively, his comment may be automatically associated with a point of the content item that was being played when he activated a control for making a comment.

Comment interface 230 of user interface 200 comprises comment browsing area 232, which may be used to present comments or help a user choose a comment to read or watch, and comment area 234, which may be used to display text and/or other information regarding a comment (e.g., commentator, date, time, rating of commentator). Comment area 234 may also or instead be used to enter a textual comment when a user chooses to do so.

Controls for initiating creation of a comment may be deployed in either or both content player interface 210 and comment interface 230. The location of such a control may determine its functionality. For example, activation of comment control 224 in content player interface 210 may initiate creation of a comment on a portion of a content item currently being played. Activation of a comment control in comment interface 230, however, may initiate creation of a comment on a comment the user has selected or is currently reviewing.

In some embodiments of the invention, presentation of a content item is affected automatically when a user takes action in comment interface 230, and/or presentation of comments is affected when the user takes action in player interface 210.

Illustratively, as a user fast forwards, rewinds, pauses or otherwise manipulates presentation of the content item, comment interface 230 is updated to offer or present comments that correspond to the current time index of the item presented by information player 212.

Similarly, as a user opens, scrolls through or otherwise manipulates comments offered in comment interface 230, the content item presented in the information player may fast forward, rewind, pause, etc. In particular, presentation of the item may pause while a user opens or investigates a comment (e.g., by reading it, opening data linked to or included with the comment), or a volume output of the information player may decrease to avoid drowning out an audio comment.

In yet other embodiments of the invention, while or after a discrete, user-identified portion (e.g., an assertion, a statement) of a content item is presented in content player 212, one or more audio/video comments associated with that portion may be automatically presented in comment interface 230 or content interface 210. For example, the highest rated comment that assents with the portion may be played, as well as the highest rated comment that dissents from or disagrees with the portion. A comment may be deemed to assent with or dissent from its target based on the content of the comment and/or a rating assigned to the target by the commentator.

Figure 3:
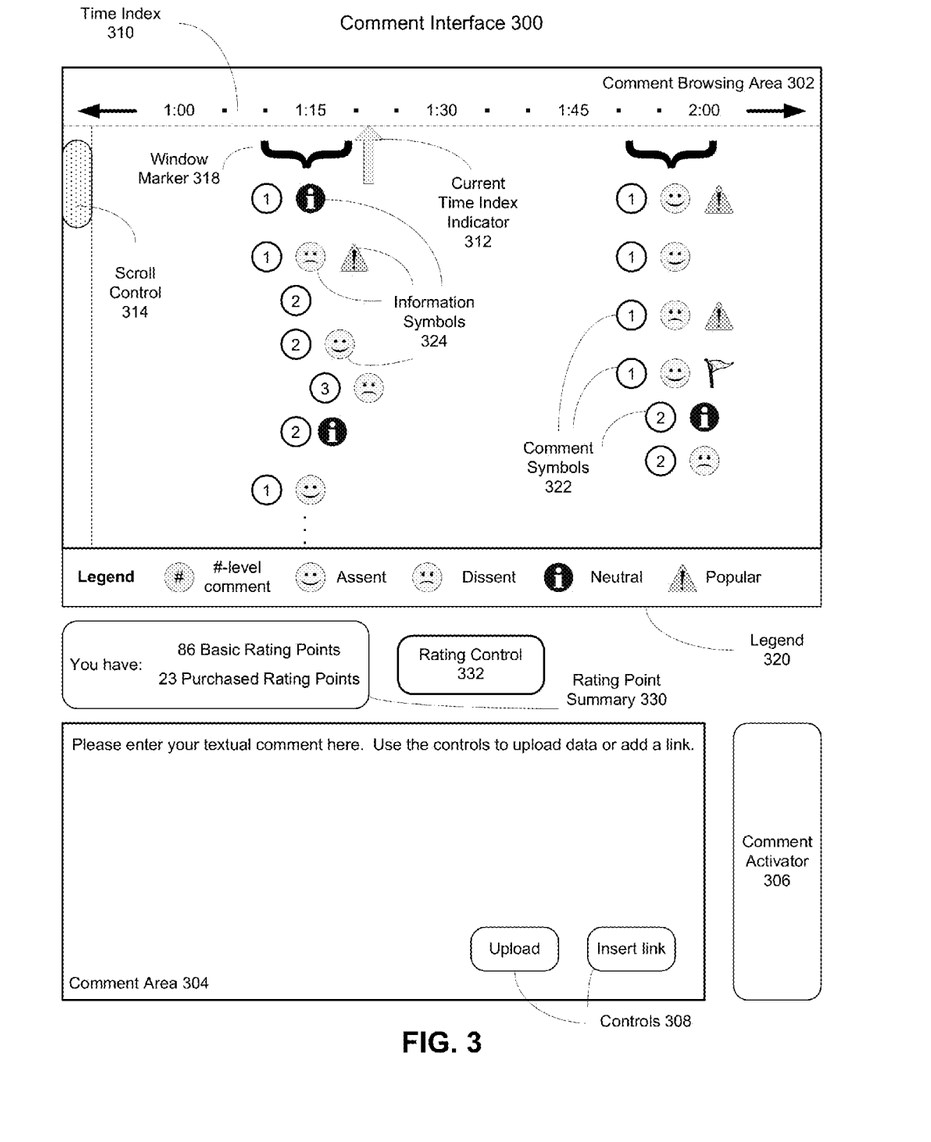
FIG. 3 is a diagram of a comment interface portion of a user interface for a system for rating and/or commenting on electronic content, according to some embodiments of the invention.

FIG. 3 is a diagram of a comment interface portion of a user interface, according to some embodiments of the invention.

As with comment interface 230 of FIG. 2, comment interface 300 comprises comment browsing area 302 and comment area 304, in which a user may enter her textual comments. Comment activator control 306 may be employed to initiate or enter a comment, while controls 308 may be employed to upload or link supporting data for the user's comment.

Within comment browsing area 302, representations of user comments (described below) scroll across the display area as an associated content item is viewed (e.g., in content player 212). Time index 310 tracks the progress of the content item. Thus, as the time index of the item advances in a content player, time index 310 and representations of user comments scroll horizontally.

For example, in FIG. 3, the browsing area covers approximately a one minute period of time, from a time index approximately one minute into the content item to a time index approximately two minutes into the compilation. Current time indicator 312 identifies a time index at which the associated content item is currently playing.

Scroll control 314 allows a user to scroll downward and upward through the contents of browsing area 302. Arrows, buttons or other controls in time index 310 (or elsewhere in comment interface 300) allow the user to scroll left and right (i.e., backward and forward in time).

Window markers 318 mark portions of the content item that one or more users have defined and/or targeted with comments. As described above, a user may tag boundaries of a particular statement, assertion, event, sentence, word or other portion of a content item, and have his or her comment associated with that portion. Although window markers 318 identify periods of time of approximately ten seconds each in FIG. 3, a window may comprise any period of time, from a single instant to the duration of a content item.

Discrete portions of a content item (and their corresponding window markers 318) may overlap, and one or more may even be completely encompassed by another. Illustratively, however, multiple portions defined very minutely (e.g., as a single time index) may be merged if they are sufficiently close in time. Similarly, a portion wholly enclosed within another may be merged with the other if the other is relatively close in duration.

Within comment browsing area 302, user comments are represented by various symbols, which may differ considerably between embodiments of the invention. The symbols may be understood by referencing legend 320.

In the embodiments illustrated in FIG. 3, individual comments are represented by comment symbols 322, which appear as numerals within circles, wherein the numeral reflects the level of the comment. In some alternative embodiments, all comments may be represented similarly or different symbols may be used. Thus, comments need not be nested or indented as shown in FIG. 3, and the target of a given comment may be readily determined by examining the comment or accompanying metadata.

The vertical order in which comment symbols 322 are listed may reflect the ordering of the corresponding comments, with the most recent (or oldest) at the top, and those older (or more recent) descending therefrom. Note that comments at a $2^{nd}$, $3^{rd}$ and further levels may be lined up underneath the comment that they target (as shown in FIG. 3), or may also be listed according to time and be linked to their target comments in some other manner (e.g., by a reference or link that appears in the comment when it is read).

A user may view a particular comment and/or associated metadata (e.g., commentator, date, time, rating) by mousing-over the corresponding comment symbol 322, clicking on it or taking some other action. The content of the comment may be displayed in browsing area 302 (e.g., in a box superimposed over the browsing area), within comment area 304, a content player (e.g., player 212 of FIG. 2) or in some other location.

Information symbols 324 provide information regarding a comment associated with the symbols. As in FIG. 3, information symbols may be placed next to the corresponding comment symbol. Thus, a "smiling face" symbol indicates an assenting comment, while a "frowning face" indicates a dissenting comment. Other symbols may be used to indicate a neutral comment, which may simply provide additional information, to identify particularly popular comments (e.g., based on the number or value of users' rating), etc. Not all comments need be accompanied by informative symbols in all embodiments of the invention.

In some embodiments of the invention, an assenting or dissenting symbol signifies that the associated comment/commentator agrees with or disagrees with the content item or higher-level comment that is the subject of the associated comment. More specifically, when a new comment is made, its target is either the current content item or a portion of the compilation (i.e., for a $1^{st}$ level comment), or a previous comment. An "assenting" or "dissenting" symbol that accompanies the new comment signifies that the new comment agrees with or disagrees with its target.

Note that this means that such symbols must be understood in context with the chain of comments leading to the new comment. Therefore, the symbols should not be automatically assumed to mean that the new comment agrees or disagrees with the instant content item, unless the new comment is a $1^{st}$ level comment.

However, in some alternative embodiments of the invention, a symbol representing the outlook of a comment (e.g., assenting, dissenting) may always refer to the content item (and not to any higher level comment).

In some embodiments of the invention, commentators are invited or even required to categorize their comments. Such categorization may be involve characterizing a comment as assenting or dissenting with its target or the current content item, being neutral, being informative (e.g., providing information tangentially related to the target of the comment), being amusing, etc.

A commentator may also specify that her comment, or some uploaded or linked data, is not suitable for minors, depicts graphic violence or may be offensive to some people for some other reason. Information symbols may be used to quickly impart that opinion to users.

In some embodiments of the invention, user comments may be viewed directly in comment browsing area 302. For example, instead of (or in addition to) symbols representing comments, several words of a comment may be displayed, and may exhibit different characteristics (e.g., font, size, color, italics, bold, underlining) to differentiate assenting and dissenting comments or to reflect other differences.

In the illustrated embodiments of the invention, comment interface 300 also comprises rating point summary 330 and rating control 332. Summary 330 is configured to indicate how many rating points the user currently possesses, which may be of different types or currencies. For example, in FIG. 3, the user possesses 86 basic rating points and 23 purchased rating points.

Rating control 332 is used to make a rating. Thus, the user may activate control 332 and vote for or enter a rating for the present content item or for an existing comment. The user may be able to use more than one rating point at a time, and may be able to rate any number of comments represented in comment browsing area 302.

Although not shown in FIG. 3, a comment interface for offering or presenting comments to a user may include controls for filtering the display. For example, a user may be able to filter or sort comments by user rating, viewpoint or outlook (e.g., assents with target, dissents from target, neutral), commentator, date, time, presence of supporting data, etc.

Figure 4:
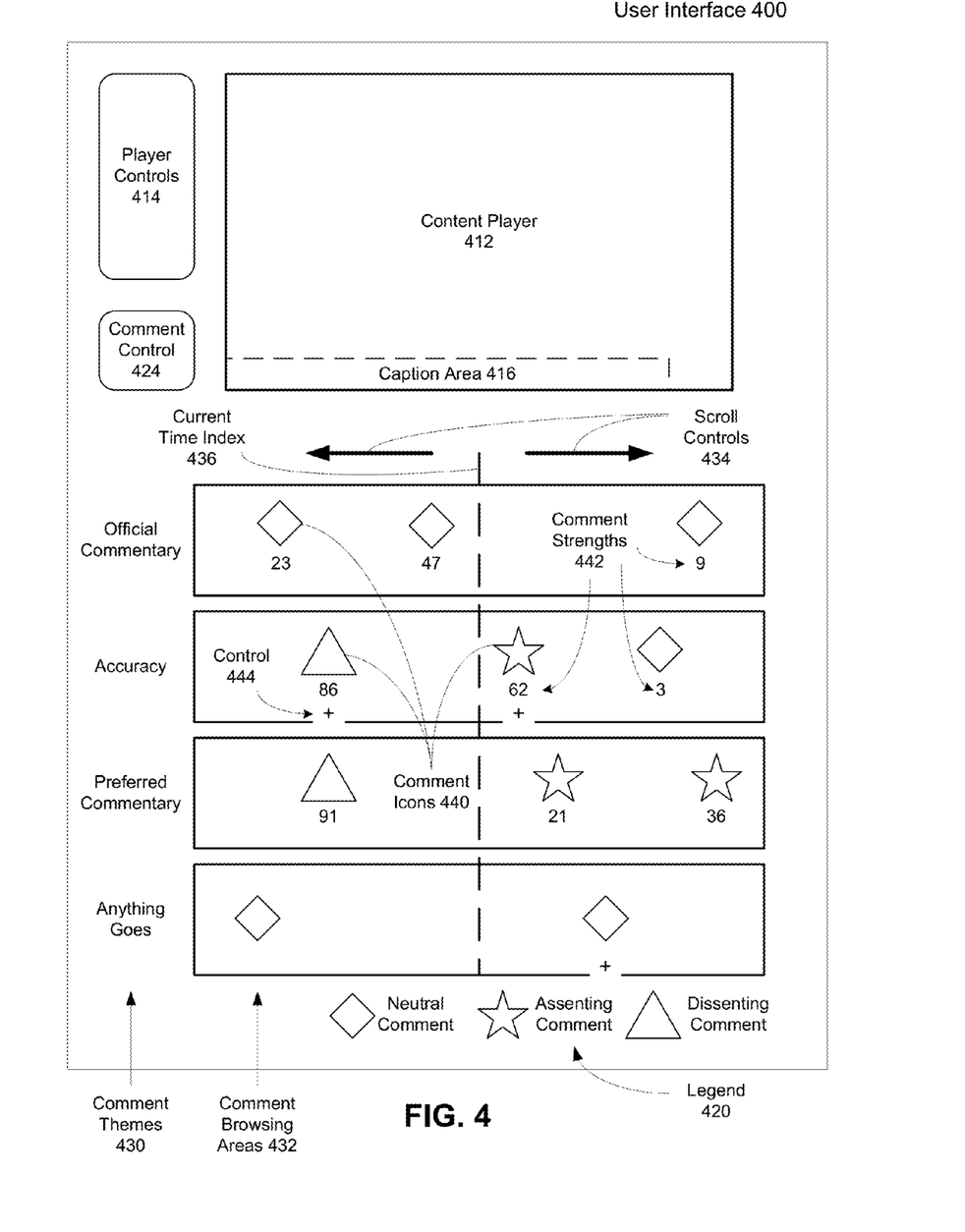
FIG. 4 is a diagram of a user interface for presenting online content and associated comments, according to some embodiments of the invention.

FIG. 4 is a block diagram of a user interface for an online rating system, according to some embodiments of the invention. In these embodiments, user interface 400 includes content player 412 and multiple browsing areas 432 for viewing comments categorized by themes 430, plus various controls for controlling operation of the content player and accessing and entering comments.

Content player 412 presents any type of electronic content, particularly video and multimedia content. Operation of the player is controlled via player controls 414, which may allow a user to pause, fast forward, rewind or otherwise manipulate presentation of content. Controls 414 may also include one or more controls for identifying a discrete portion of the content item (i.e., to serve as the target of a comment).

Optional caption area 416 may present textual transcripts of audio portions of content presented by content player 412. Comment control 424 may be activated by a user to initiate entry of a comment regarding the content presented in content player 412 or a comment presented or represented in a browsing area 432.

As shown in FIG. 4, comments may be segregated by categories or themes 430. Illustrative categories or themes include "Official Commentary" (e.g., comments made by a person or persons affiliated with the present content or the provider of the present content), "Accuracy" (e.g., comments relating to the accuracy or credibility of the content or another comment), "Preferred Commentary" (e.g., comments made by preferred users), "Anything Goes" (e.g., comments meant to be amusing, sarcastic, irreverent or even irrelevant), etc. The themes identified in FIG. 4 are merely illustrative; in different embodiments of the invention, comments may be categorized using any themes desired.

A user or commentator may be considered "preferred" (e.g., for purposes of the "Preferred Commentary" theme) based on their comment history. For example, if a user enters some number of comments that a significant number or proportion of other users agree with or rate highly, that user may be elevated to a "Preferred" level. A user may thus gain preferred status based on a number of comments she enters, ratings of her comments by other users, through selection by a moderator, or for some other reason.

Illustratively, when a user enters a comment, he or she may select or specify an appropriate theme. However, a moderator may move comments between themes.

Within a browsing area 432, comment icons 440 represent individual comments and scroll horizontally in synchronization with the content being presented in content player 412. As described previously, comments that target the content may be associated with specific portions of the content to which the comments relate. Current time index 436 marks the portions of the browsing areas that correspond to the current time index of the content.

Some or all comment icons 440 may be accompanied by strength factors 442, which indicate relative strengths of the corresponding comments. For purposes of the illustrated embodiments of the invention, a comment's "strength" represents a degree to which other users agree with the comment. For example, a rating of 23 for a given comment may indicate that 23% of all users who evaluated or rated that comment agree with it.

Comment icons 440 may be configured to indicate the nature of the corresponding comments. For example, as legend 420 indicates, different shapes may indicate tones, viewpoints or other characteristics of the comments.

Clicking on or otherwise activating an icon (e.g., by mousing over it) may open the comment for reading (or playing, if it comprises audio), or may open a comment interface for reading and/or entering comments.

When multiple comments target the same portion or time index of a content item, because browsing area 432 may only accommodate presentation of a single comment icon 440 for that portion or time index, the icon that is presented may correspond to the comment that has the highest rating from other users. Activating the displayed comment icon allows a user to view that comment and any others that have the same target.

Control 444 in proximity to a given comment icon 440 indicates that one or more additional comments exist for the same portion of the content targeted by the comment that corresponds to the icon. Activating control 444 allows a user to view the additional comment(s).

In other embodiments of the invention, control 444 or some other control may be displayed in proximity to a comment icon to indicate that one or more comments exist that target the comment that corresponds to the icon.

In some embodiments of the invention, for each portion of a content item that is targeted by one or more comments, at most one comment icon of each type (e.g., neutral, assenting, dissenting) may be displayed. Within or near such an icon may be a number or other tag identifying how many comments of that type have been made. Activating (e.g., clicking on) an icon may open the comment(s) or an interface configured to present the comments.

In the illustrated embodiments of the invention, when player controls 414 are manipulated, the contents of browsing areas 432 are affected in the same manner, to pause, fast forward, rewind or otherwise alter the presentation of comment icons. Also, when a comment is initiated (e.g., by activating comment control 424) or read (e.g., by activating a comment icon 440), presentation of the present content item may automatically pause.

Additionally, scroll controls 434 may be manipulated to rewind or advance presentation of comment icons. Presentation of content within content player 412 may rewind and advance in synchronization with manipulation of the scroll controls.

Figure 5:
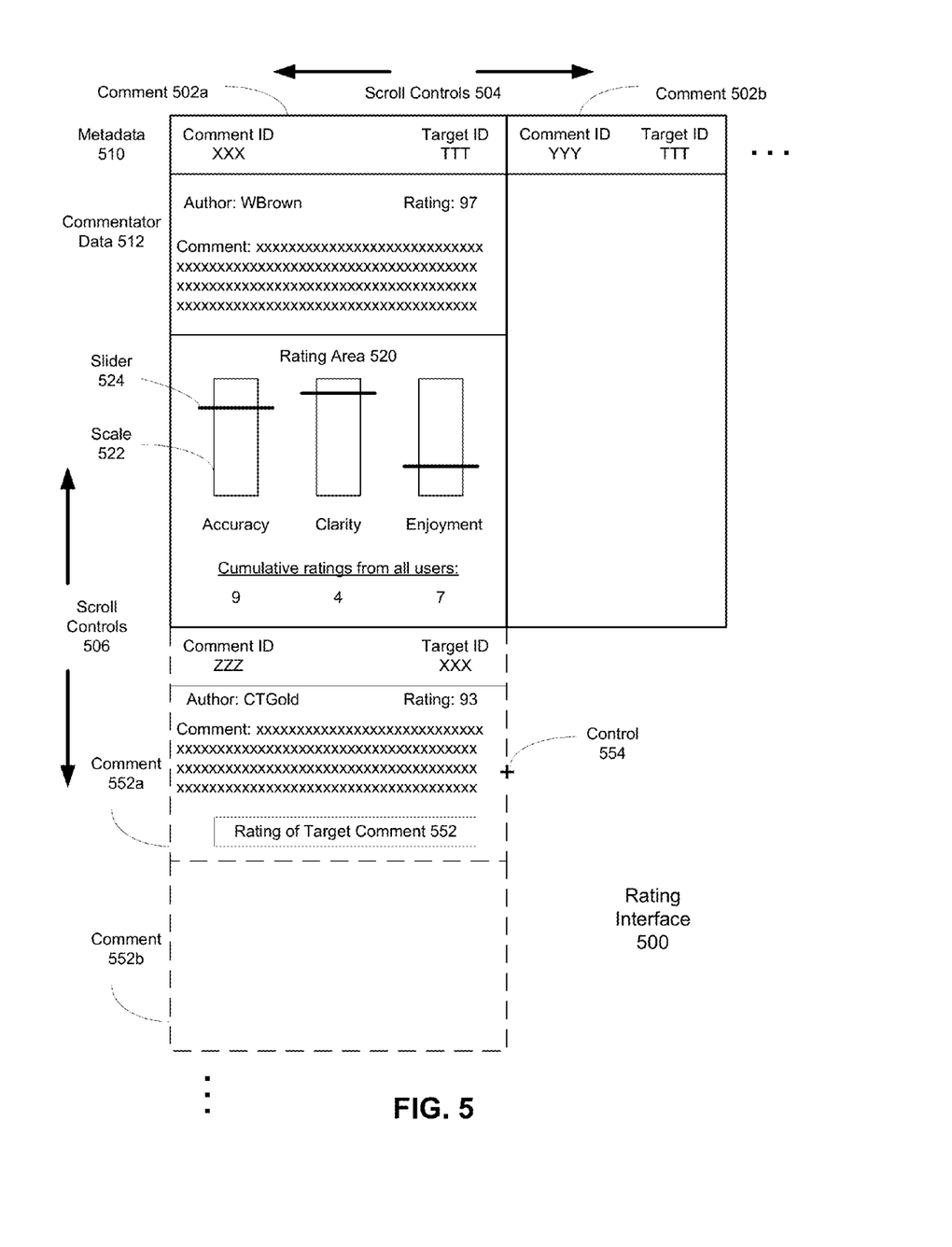
FIG. 5 is a diagram of a rating interface portion of a user interface for a system for rating electronic content, according to some embodiments of the invention.

FIG. 5 is a diagram of a rating interface for rating an existing comment and/or a content item, according to some embodiments of the invention. Interface 500 may also be used to present comments to a user (e.g., when a comment icon 440 of FIG. 4 is activated).

Within rating interface 500, comments addressing the same target (e.g., the same content item, the same portion of a content item) are aligned horizontally as comments 502 (e.g., comments 502*a*, 502*b*) and can be scrolled using scroll controls 504. Further, when a comment such as comment 502*a* is the target of one or more other comments, those comments 552 are aligned vertically below the target comment (e.g., as comments 552*a*, 552*b*), and can be scrolled using scroll controls 506.

Each comment 502 includes metadata 510 that identifies the instant comment and the comment's target. The comment also includes commentator data 512, which may identify the commentator and his or her accumulated rating (based on his/her comments that have been rated by other users), and may include the commentator's comment. Note that in other embodiments of the invention, any other desired information may be included in metadata 510 and/or commentator data 512, or they may be omitted.

A comment such as comment 502*a* in the illustrated embodiments of the invention also includes rating area 520 where the instant user (i.e., the user viewing comments 502) can rate comment 502*a*. Illustratively, one or more scales 522 and sliders 524 are provided for the user's manipulation. Each scale pertains to a particular characteristic by which the comment may be rated (e.g., accuracy, clarity, enjoyment, bias, credibility, violence, prurience).

The instant user merely adjusts sliders 524 as desired to enter his rating. In other embodiments, ratings may be alphabetical (e.g., A-F), alphanumerical, or have some other form. Also, in other embodiments of the invention, a user may directly enter (e.g., type) his rating into a text box or dialog window, may select his rating from a set of options, or take other action to record his rating.

Also in rating area 520, cumulative ratings for the commentator or originator of comment 502*a* may be listed. Other components may be included or associated with a comment 502 in other embodiments of the invention, such as a control for entering a comment targeting the comment 502, searching one or more comments, sorting comments, etc.

Below comment 502a, one or more comments 552 that target comment 502a are aligned. Each comment 552 includes metadata identifying the comment and its target (i.e., comment 502a), commentator data that includes the comment and identifies the commenter and his or her ranking, and possibly the commenter's rating of comment 502a.

A comment 552 may also include control 554 if one or more comments have been submitted that target the comment 552. Activating this control may open those comments in another interface similar to rating interface 500.

Illustratively, if the instant user selects (e.g., clicks on) comment 502b, the comments that address the same target (i.e., target TTT), including comment 502a, may scroll to the left. If the user selects comment 552b, comments 552 may scroll upward, but without moving comment 502a.

Rating interface 500 may also include controls for entering a comment, which may target either the current content item or another comment, for sorting comments, searching comments, retrieving other comments by a selected commentator, etc.

In some embodiments of the invention, when a user is watching a content item, activation of a control for entering a comment on a portion of that content item may cause an interface to be presented that is similar in appearance to a comment 502. With such an interface, the user may enter his or her comment on the content item, submit a rating of the content item (or the target portion of the content item), define the portion of the content item that he or she is targeting, and/or take other action.

Figure 6:
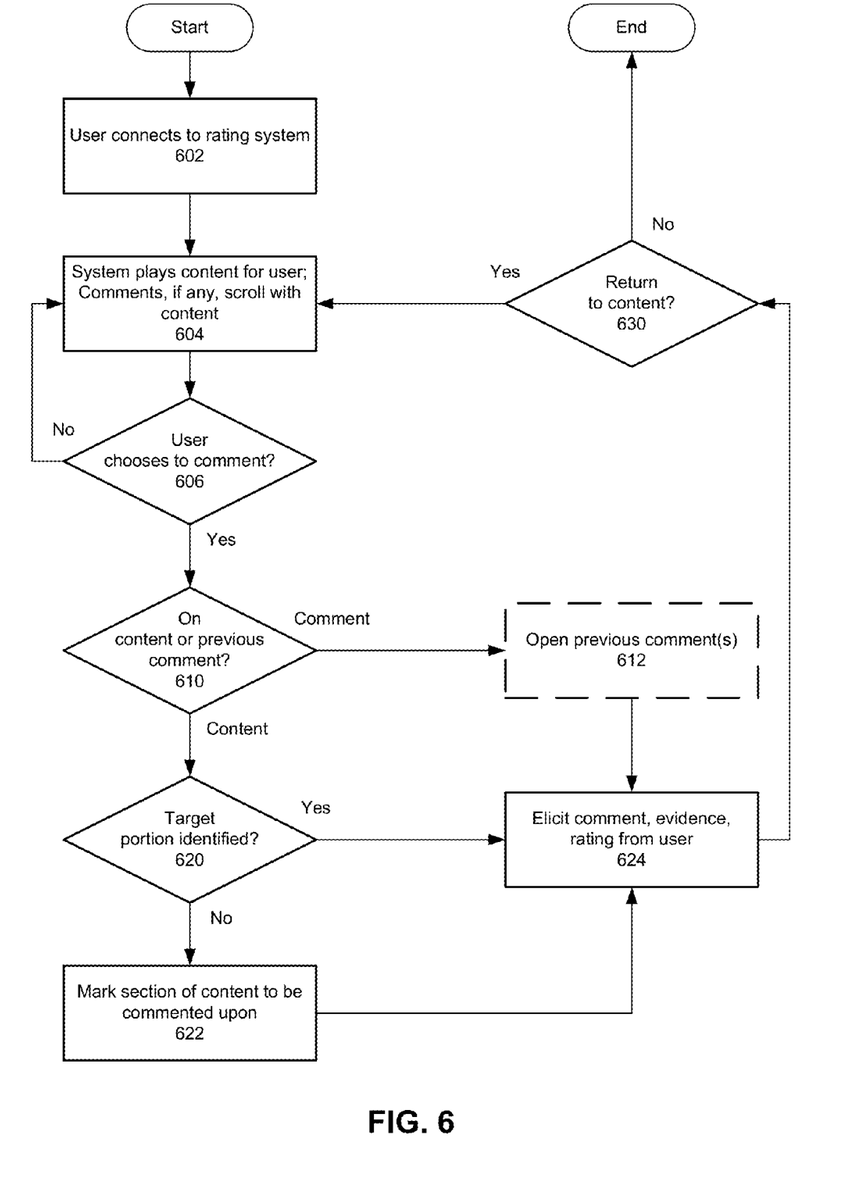
FIG. 6 is a flowchart demonstrating a method of dynamically determining a credibility rating of online content, in accordance with some embodiments of the present invention.

FIG. 6 is a flowchart demonstrating a method of rating the credibility and/or other characteristic of online content in context, according to some embodiments of the invention.

In operation 602, a user connects to an online rating system. The system may be operated by an original provider of content (e.g., a news broadcaster, a television network, a motion picture company, a recording artist), a re-publisher of content (e.g., a portal webpage, a search engine, a social networking website) or some other entity. The system is capable of presenting or playing content items for users as well as receiving comments and accepting ratings of content and/or comments.

The user may be required to authenticate himself to the system (e.g., with a username and password), or may be able to leave comments and make ratings anonymously. If the user is required to register, the system may maintain a profile of the user, to include his identity, electronic mail address, rating history (e.g., ratings made by the user, ratings of the user's comments by other users), rating points, etc.

In operation 604, the user selects a content item (possibly using a search function) and the system begins playing or presenting it. As described above, other users' comments or representations of such comments (if any comments have been made) may be presented in context with portions of the content that the comments targeted. The user may control presentation of the content item and/or the comments, to pause, stop, rewind, fast forward, etc.

In some embodiments of the invention, a user may upload a content item to the system for playing and/or commenting. Thus, an individual who creates or records content may use the system to publish it and obtain other users' ratings and comments.

In operation 606, and possibly throughout presentation of the selected content item, the system determines whether the user wishes to make a comment or enter a rating. He may signal such a desire by activating an appropriate control, such as a control associated with adding a comment, or marking a portion of the content item as a target of a comment, selecting another user's comment, etc. As long as the user has not yet requested to enter a comment, the method returns to operation 604 to continue presenting the content.

In operation 610, the user has elected to make a comment or enter a rating, and so the system determines whether the comment targets the selected content item or an existing comment. Illustratively, the system may assume the comment addresses the content item unless the user has selected an existing comment (e.g., by clicking on it, by reading it, by mousing-over it).

Alternatively, when the user activates a control for making a comment or rating, the system may specifically inquire what the user wishes to do. Regardless, when the user activates a control for making a comment, presentation of the content item may automatically pause or stop.

If the comment addresses the content item, the illustrated method advances to operation 620; otherwise, the comment will target an existing comment and the method continues at operation 612.

In optional operation 612, the system opens or expands a comment portion of the user interface and waits for the user to select the target comment. This operation may be unnecessary if the user had selected the target comment before initiating creation of his new comment. After operation 612, the method advances to operation 624.

In operation 620, the user has elected to comment on a content item, and the system determines whether the target portion of the content item has been identified or selected. As described above, a user interface employed by the system may help a user identify starting and ending points of the target portion of the content.

In some embodiments of the invention, after one or more portions of the content item have been demarcated, when a user initiates creation of a comment on the content item, the comment may by default be associated with a defined portion of the content item that encompasses the time index that was being presented when the comment was initiated (e.g., the shortest defined portion).

Of course a user may also be able to define a specific portion of the content item that he is targeting with his comment, even if other portions have already been defined. In some embodiments, the system may merge some defined portions if they are very similar or virtually identical (e.g., in terms of starting and ending points), or if one encompasses the other.

If a target portion of the content item has already been identified and defined for the user's comment, the method advances to operation 624; otherwise, the method continues with operation 622.

In operation 622, the user is prompted to identify the target portion of the content item. Illustratively, the user may rewind, fast forward or otherwise implement the information player to locate the starting and ending points, and may mark them by activating corresponding controls.

In some alternative embodiments, the user may be presented with representations of defined portions of the content item that encompass or are close in time to the time index of the content that was playing when the comment was initiated. The user may then simply select one, or investigate each (e.g., trigger presentation of the corresponding portion).

In operation 624, the system accepts the user's comment, any supporting or related data the user may wish to submit, any rating(s) the user may desire to enter, and/or take other action.

To rate the credibility or other characteristic of the target of the comment, the user may be prompted to enter or select a value between two thresholds (e.g., 0 and 10, A and F), adjust a slider to graphically (and/or numerically) depict the rating, or manipulate other controls.

As already described, the user may be invited (or required) to characterize the comment. He may be able to specify that it supports or opposes its target, is neutral, is unsuitable for minors, may select or specify a category or theme for the comment (e.g., accuracy, "anything goes", bias, clarity), etc.

Illustratively, he may also be able to specify that his comment includes conclusive proof of the accuracy or inaccuracy of the target, and his comment may be accompanied by an information symbol reflecting this assertion. This characterization may be voidable if sufficient other users rate the comment very low or inconclusive, or if a system operator chooses to void it.

Upon completion of entry of the comment, a representation or snippet of the new comment may appear in a comment interface portion of the system's user interface. The comment may be examined for viruses, swearing and/or other objectionable content, and/or may also be checked for errors in grammar, spelling, etc.

In operation 630, the system determines how to proceed after the comment has been accepted. If the user chooses to return to the content item or other users' comments, the method returns to operation 604; otherwise, the method ends.

Although not shown in the flowchart of FIG. 6, the system tallies users' ratings to determine a rating of the selected content item. This computation may be repeated regularly or continuously, as new ratings are received, so as to provide a real-time rating of the compilation that can be displayed to users.

In embodiments of the invention in which ratings are numeric (e.g., 1-10, 1-100, 0 or 1), users' ratings may be simply averaged. If multiple types of ratings are enabled (e.g., corresponding to different rating "currencies"), multiple tallies may be performed. Illustratively, each category or type of rating may be computed and reported separately, or multiple categories may be merged.

For example, one point of an "earned" rating currency may carry twice the weight of a "basic" rating currency. In this case, ratings made using earned currency may be used to produce a weighted average of basic and earned ratings.

Figure 7:
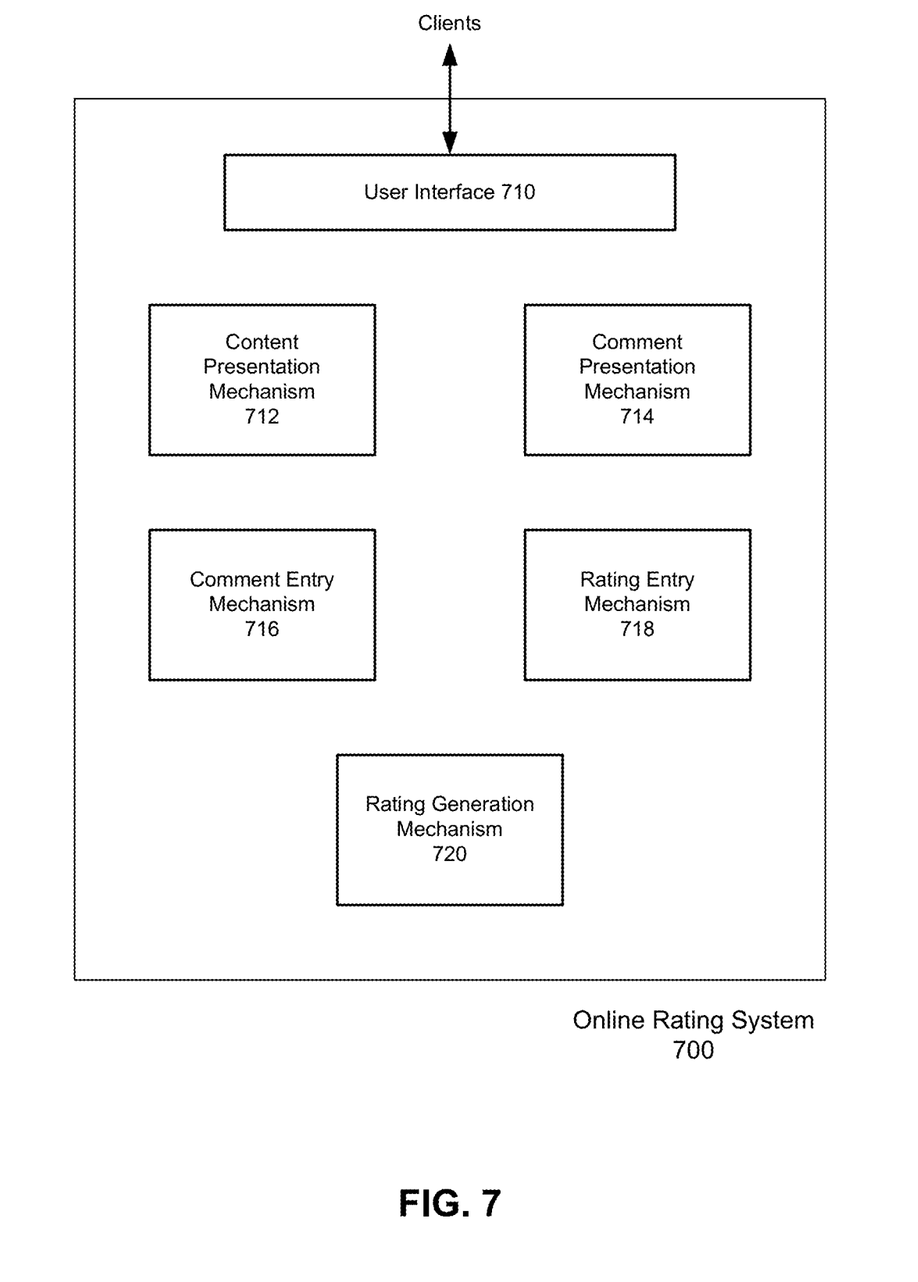
FIG. 7 is a block diagram of hardware apparatus for facilitating online rating of electronic content, according to some embodiments of the invention.

FIG. 7 is a block diagram of hardware apparatus for facilitating online rating of electronic content, according to some embodiments of the invention.

Online rating system 700 comprises user interface 710, content presentation mechanism 712, comment presentation mechanism 714, comment entry mechanism 716, rating entry mechanism 718 and rating generation mechanism 720. Any or all of these mechanisms may be combined in other embodiments of the invention.

User interface 710 is adapted to display data and operational controls to a user, and receive data and control inputs from the user.

Content presentation mechanism 712 is adapted to present a user with all or a portion of a content item comprising a video, a textual document, a blog entry, or other textual or multi-media information content. Mechanism 712 may also include controls for controlling presentation of the content item and/or for defining discrete portions of the content.

Comment presentation mechanism 714 is adapted to offer a user comments associated with a content item being presented via content presentation mechanism 712. Comments "associated" with a content item include comments that directly target the content item, as well as comments within a chain of comments descending from a comment that directly targets the item.

Any number of comments may be presented, and may be presented as text, video, multimedia or as symbols representing comments. In the latter case, the user may open a comment by manipulating the associated symbol or other control.

Comments may be grouped according to specific portions of the content item that they target, by commentator, by time, by some characterization of the comments (e.g., assenting, dissenting, neutral, popular). Mechanism 714 may also include controls for controlling presentation of the comments (e.g., to scroll them, filter or sort them, reverse the sorting).

Comment entry mechanism 716 is adapted to accept a new comment from a user. The mechanism may include controls or interfaces for entering text, recording video and/or audio, uploading data or a comment, linking to other online content, etc.

Rating entry mechanism 718 is adapted to accept a user's rating of a content item and/or another user's comment. Each user rating may encompass the expenditure of one or more rating units (or rating "currency").

The manner in which a rating is expressed may vary from embodiment to embodiment. Thus, in some embodiments the user may be prompted to enter an alphanumerical value (e.g., between 1 and 100, between 1 and 10, between A and F) representing his rating, and may be able to rate the content item or comment in any number of categories (e.g., credibility, bias, clarity, persuasiveness, attractiveness, violence).

Rating generation mechanism 720 is adapted to aggregate multiple users' ratings for a content item, an entity that comprises or provides the content item (e.g., a television or web show, a cable network, a news company), or a comment. Mechanism 720 and/or another mechanism may be adapted to present such ratings to users.

Figure 8:
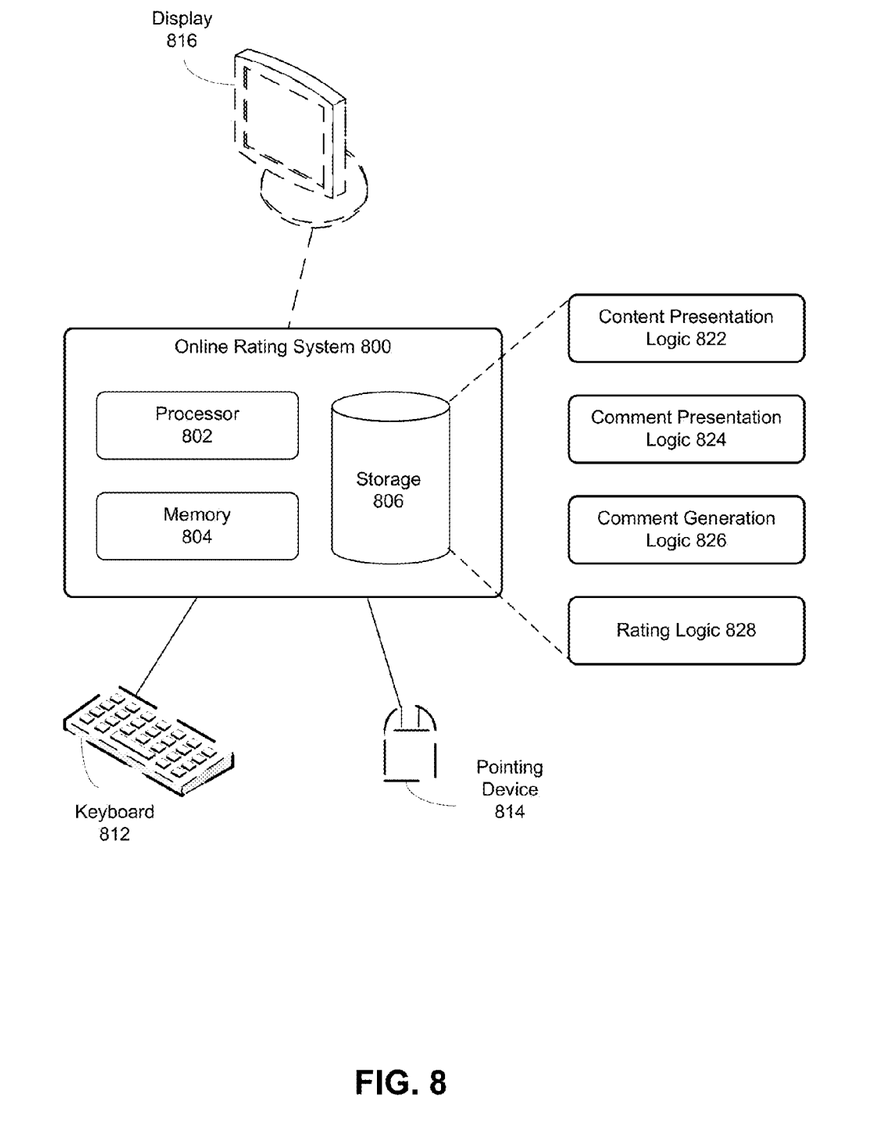
FIG. 8 is a block diagram of an online rating system, according to some embodiments of the invention.

FIG. 8 is a block diagram of a dynamic online rating system, according to some embodiments of the invention.

Online rating system 800 of FIG. 8 comprises processor 802, memory 804 and storage 806, which may comprise one or more optical and/or magnetic storage components. Online rating system 800 may be coupled (permanently or transiently) to keyboard 812, pointing device 814 and display 816.

Storage 806 of the online rating system stores logic that may be loaded into memory 804 for execution by processor 802. Such logic includes content presentation logic 822, comment presentation logic 824, comment generation logic 826 and rating logic 828.

Content presentation logic 822 comprises processor-executable instructions for presenting all or a portion of a content item to a viewer. Logic 822 may thus include logic associated with a media player, word processor and/or other program logic configured to present content. Logic 822 may also include logic for defining a discrete portion of a content item.

Comment presentation logic 824 comprises processor-executable instructions for presenting some or all comments associated with a content item. Comment presentation logic 824 may also include logic for filtering or sorting existing comments based on some criteria (e.g., age, viewpoint, popularity).

Comment generation logic 826 comprises processor-executable instructions for receiving a new comment from a user or facilitating generation of a new comment by the user. Logic 826 may be configured to assist the user in tying other data with his or her comment.

Rating logic 828 comprises processor-executable instructions for accepting a user's rating of a content item and/or a comment associated with the content item. Logic 828 may also be configured to periodically or continually calculate an aggregate rating that reflects multiple (e.g., all) users' ratings.

In some embodiments of the invention, ratings may be computed for more than just discrete content items. For example, if content items are associated with their sources, and multiple content items from a single source have been rated, those ratings may be aggregated to generate a rating for that source. The source may be an original content provider or generator, a television show or series (wherein each content item is one episode), a private blogger (wherein each content item may be a separate blog entry), etc.

In addition, of course, users may rate other users' comments. Thus, a particular comment may have a rating indicating other users' estimates of its credibility (or other characteristic), and ratings of multiple comments from one commentator may receive a rating based on the ratings of the multiple comments.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A computerized method of rating electronic content, the method comprising:
    transmitting electronic content to a computing device operated by a first user for presentation via a content player;
    transmitting to the computing device multiple comments associated with the electronic content, to be offered to the first user for viewing;
    awarding the first user a first quantity of a first rating currency;
    awarding the first user a second quantity of a second rating currency;
    awarding the first user a quantity of a third rating currency in return for payment in legal tender;
    receiving from the first user:
        identification of a rating target, wherein the rating target is one of:
            a discrete first portion of the electronic content; and
            an existing comment on the electronic content; and
        a first rating of the rating target, the first rating comprising amounts of one or more of the first rating currency and the second rating currency; and
    storing the first rating with an association to the rating target;
    wherein the quantity of the first rating currency is awarded to the first user on a periodic basis;
    wherein the quantity of the second rating currency is awarded to the first user in return for one or more of:
        submission of a new comment;
        submission of a new rating; and
        parsing of an electronic content item into segments; and
    wherein a unit of the second rating currency has more value than a unit of the first rating currency.

2. The method of claim 1, further comprising:
    aggregating the first rating with ratings of the rating target received from other users, to produce a cumulative rating of the rating target.

3. The method of claim 1, further comprising:
    receiving from the first user a second rating of a second portion of the electronic content, wherein the second portion of the electronic content is distinct from the first portion of the electronic content.

4. The method of claim 1, wherein:
    each of the multiple comments is associated with one of multiple portions of the electronic content, and is offered to the first user proximate in time to when the associated portion of the electronic content is presented.

5. The method of claim 1, wherein a given comment is associated with the electronic content if:
    the given comment targets a portion of the electronic content; or
    the given comment targets a previous comment within a chain of comments that targets the electronic content.

6. The method of claim 1, wherein said identification of a discrete first portion of the electronic content comprises:
    a time index within the electronic content, wherein the first portion of the electronic content is determined to comprise a segment of the electronic content presented at the identified time index.

7. The method of claim 1, wherein said identification of a discrete first portion of the electronic content comprises:
    a starting time index within the electronic content and an ending time index within the electronic content, wherein the first portion of the electronic content is determined to comprise a segment of the electronic content between the starting time index and the ending time index.

8. The method of claim 1, wherein said identification of a discrete first portion of the electronic content comprises:
    a copy of a segment of the electronic content, wherein the first portion of the electronic content is determined to comprise the segment.

9. A non-transitory computer-readable medium storing instructions that, when executed by a computer, cause the computer to perform a method of rating electronic content, the method comprising:

transmitting electronic content to a computing device operated by a first user for presentation via a content player;

transmitting to the computing device multiple comments associated with the electronic content, to be offered to the first user for viewing;

awarding the first user a first quantity of a first rating currency;

awarding the first user a second quantity of a second rating currency;

awarding the first user a quantity of a third rating currency in return for payment in legal tender;

receiving from the first user:
   identification of a rating target, wherein the rating target is one of:
      a discrete first portion of the electronic content; and
      an existing comment on the electronic content; and
   a first rating of the rating target, the first rating comprising amounts of one or more of the first rating currency and the second rating currency; and storing the first rating with an association to the rating target;

wherein the quantity of the first rating currency is awarded to the first user on a periodic basis;

wherein the quantity of the second rating currency is awarded to the first user in return for one or more of:
   submission of a new comment;
   submission of a new rating; and
   parsing of an electronic content item into segments; and wherein a unit of the second rating currency has more value than a unit of the first rating currency.

10. An apparatus for rating electronic content, comprising:
one or more processors;
memory storing instructions that, when executed by the one or more processors, cause the apparatus to:
   transmit electronic content to a computing device operated by a first user for presentation via a content player;
   transmit to the computing device multiple comments associated with the electronic content, to be offered to the first user for viewing;
   award the first user a first quantity of a first rating currency;
   award the first user a second quantity of a second rating currency;
   award the first user a quantity of a third rating currency in return for payment in legal tender;
   receive from the first user:
      identification of a rating target, wherein the rating target is one of:
         a discrete first portion of the electronic content; and
         an existing comment on the electronic content; and
      a first rating of the rating target, the first rating comprising amounts of one or more of the first rating currency and the second rating currency; and
   store the first rating with an association to the rating target;
wherein the quantity of the first rating currency is awarded to the first user on a periodic basis;
wherein the quantity of the second rating currency is awarded to the first user in return for one or more of:
   submission of a new comment;
   submission of a new rating; and
   parsing of an electronic content item into segments; and
wherein a unit of the second rating currency has more value than a unit of the first rating currency.

11. The apparatus of claim 10, wherein the memory further comprises instructions that, when executed by the one or more processors, cause the apparatus to:
aggregate the first rating with ratings of the rating target received from other users, to produce a cumulative rating of the rating target.

12. The apparatus of claim 10, wherein the memory further comprises instructions that, when executed by the one or more processors, cause the apparatus to:
receive from the first user a second rating of a second portion of the electronic content, wherein the second portion of the electronic content is distinct from the first portion of the electronic content.

13. The apparatus of claim 10, wherein: each of the multiple comments is associated with one of multiple portions of the electronic content, and is offered to the first user proximate in time to when the associated portion of the electronic content is presented.

14. The apparatus of claim 10, wherein a given comment is associated with the electronic content if:
the given comment targets a portion of the electronic content; or
the given comment targets a previous comment within a chain of comments that targets the electronic content.

15. The apparatus of claim 10, wherein said identification of a discrete first portion of the electronic content comprises:
a time index within the electronic content, wherein the first portion of the electronic content is determined to comprise a segment of the electronic content presented at the identified time index.

16. The apparatus of claim 10, wherein said identification of a discrete first portion of the electronic content comprises:
a starting time index within the electronic content and an ending time index within the electronic content, wherein the first portion of the electronic content is determined to comprise a segment of the electronic content between the starting time index and the ending time index.

17. The apparatus of claim 10, wherein said identification of a discrete first portion of the electronic content comprises:
a copy of a segment of the electronic content, wherein the first portion of the electronic content is determined to comprise the segment.

\* \* \* \* \*